United States Patent [19]
Baird

[11] 3,928,111
[45] Dec. 23, 1975

[54] PROCESS OF MAKING A COMPOSITE STRUCTURE OF ISOCYANATE COATED ELASTOMERIC HYDROCARBON AND METAL

[75] Inventor: Richard Leroy Baird, Wilmington, Del.

[73] Assignee: E. I. Du Pont de Nemours and Company, Wilmington, Del.

[22] Filed: Jan. 25, 1974

[21] Appl. No.: 436,542

[52] U.S. Cl. ............... 156/315; 156/330; 156/331; 156/332; 260/75 R; 428/416; 428/420; 428/424

[51] Int. Cl.² .................. C09J 5/02; B32B 31/12; B32B 25/08; B32B 15/08

[58] Field of Search.......... 117/47 R, 49, 72, 122 H, 117/122 PA, DIG. 7; 156/110 A, 309, 310, 156/330, 331, 332, 315; 161/186, 188, 190; 260/26, 40 TN, 75 NP, 75 TN, 77.5 AN, 260/40 R, 75 R; 427/299, 327; 428/416, 428/418, 420, 423, 424

[56] References Cited
UNITED STATES PATENTS

| | | |
|---|---|---|
| 2,900,292 | 8/1959 | Coleman et al................ 156/310 X |
| 3,423,270 | 1/1969 | Heins................... 156/330 |
| 3,600,289 | 8/1971 | Bragole.......................... 204/159.14 |
| 3,651,014 | 3/1972 | Witsiepe ........................... 260/75 R |
| 3,773,595 | 11/1973 | Burba et al. ......................... 156/332 |
| 3,821,056 | 6/1974 | Reardon .............................. 156/331 |

Primary Examiner—Douglas J. Drummond
Assistant Examiner—Robert A. Dawson

[57] ABSTRACT

A process for preparing a composite structure of a metal bonded to a cured elastomeric hydrocarbon containing ethylene units and propylene units which consists essentially of coating the copolymer with a polyisocyanate having an —NCO functionality of at least three and wherein the —NCO groups are unhindered and on separate rings, applying an epoxy-based or chlorinated rubber/phenolic resin-based adhesive primer to the surface of the metal to be bonded and interposing between the surfaces an adhesive composition of a thermoplastic segmented copolyester (optionally, containing up to 60 weight percent of a thermoplastic resin which forms compatible mixtures with the segmented copolyester), applying heat and pressure to the metal and elastomer to bond the elements.

15 Claims, No Drawings

PROCESS OF MAKING A COMPOSITE STRUCTURE OF ISOCYANATE COATED ELASTOMERIC HYDROCARBON AND METAL

BACKGROUND OF THE INVENTION

This invention relates to a process for rapidly bonding a metal to a cured elastomeric ethylene copolymer and to the resulting composite structure.

Various techniques have been used to bond cured elastomeric hydrocarbon copolymers to metal substrates. However, it is very difficult to form a tenacious adhesive bond between these elastomers and metals because elastomeric hydrocarbon copolymers have very low surface tension and some metals, for example, chrome-plated steel, have such a hard, smooth surface that few materials can be satisfactorily adhesively bonded to them. Further, commonly employed thermoplastic adhesives are not entirely satisfactory bonding agents because of diminished cohesive strength when exposed to high temperatures, e.g., above 70°C. Rapidly curing thermoset adhesives are brittle.

Within recent years, many applications for metal-rubber composite articles have developed, especially for automotive trim parts, e.g., in energy-absorbing bumpers having rub strips where rubber is adhered to the impact bar of the bumper to protect the metal surface from scarring. If the composite article is to be used in the automotive trim field, it must withstand varied weather conditions, e.g., low temperatures and especially high temperatures, and high humidity, in addition to severe impact without loss of bond strength. In order to obtain better bonding between metal and elastomer, it has been necessary to use mechanical locking elements such as bolts. If a process is to be used successfully in the automotive industry, it must be one in which the actual bonding of the cured elastomer to the metal is completed in about a minute or less. A simple, effective method for making such composite structures is needed in which the cured elastomeric copolymer adheres tenaciously to the metal substrate without the need for conditioning the elastomer or using bolts or other locking elements.

SUMMARY OF THE INVENTION

It has been discovered that cured elastomeric copolymers can be bonded to metal by means of a copolyester thermoplastic adhesive composition, provided the surface of the cured elastomer has been coated with particular polyisocyanates. More specifically, this invention is directed to a process for manufacturing a composite structure of a metal bonded to a cured elastomeric hydrocarbon copolymer which consists essentially of coating the surface of the cured elastomeric hydrocarbon copolymer with an organic aromatic polyisocyanate having an —NCO functionality of at least three and wherein the —NCO groups of the polyisocyanate are unhindered and on separate rings, applying an epoxy-based or chlorinated rubber/phenolic resin-based adhesive primer to the surface of the metal to be bonded, and interposing between the polyisocyanate coated elastomeric hydrocarbon surface and the metal primed surface an adhesive composition, said adhesive composition comprising about 40–100 weight percent of a thermoplastic segmented copolyester having a melt index of less than 150 grams/10 minutes at 200°C. under a 2,160 gram load, a melting point of at least about 125°C., said copolyester containing 15–75, preferably 30–65 weight percent short-chain ester units represented by the formula

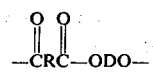

and 25–85, preferably 30–75, weight percent long-chain ester units represented by the formula

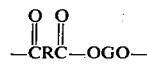

wherein R is a divalent aromatic radical having a molecular weight of about 76–220, D is a divalent organic radical having a molecular weight of about 28–195, and G is a divalent organic radical having a number-average molecular weight of about 566–3966, and up to about 60 weight percent, generally at least 40 weight percent, of a low moelcular weight thermoplastic resin which forms compatible mixtures with the segmented copolyester, is thermally stable at 150°C., and has a melt viscosity of less than about 10,000 centipoises at 200°C., applying pressure to the metal and elastomer sufficient to bond them together thus forming said composite structure. The bond between metal and elastomer is so strong that stock tear can occur instead of delamination. These composite structures, having a flexible adhesive layer free from brittleness, are especially useful as bumpers or engine mounts for automobiles.

DETAILED DESCRIPTION OF THE INVENTION

It has been discovered that when the surface of the cured elastomeric hydrocarbon is coated with certain organic aromatic polyisocyanates having an —NCO functionality of at least three, and wherein the —NCO groups are unhindered, i.e., not more than one substituent is ortho to the —NCO group, and the —NCO groups are on separate rings, oxidation of the surface of the elastomeric hydrocarbon prior to the coating is not required in order to bond the elastomer to metal. Representative organic aromatic polyisocyanates having the above-mentioned characteristics include triisocyanate derivatives of triphenylmethane and triphenylmethanes bearing substituents selected from $C_1$–$C_{18}$ alkyl, preferably methyl, halo, preferably chloro and bromo, and $C_1$–$C_{12}$ alkoxy, preferably $C_1$–$C_4$ alkoxy.

Representative polyisocyanates include
4,4',4"-methylidynetri(phenylisocyanate)
3,3',3"-methylidynetri(phenylisocyanate)
3,4',4"-methylidynetri(phenylisocyanate)
4,4',4"-methylidynetri(2-methylphenylisocyanate)
3-methyl-4,4',4"-methylidynetri(phenylisocyanate)
6-methyl-3,4',4"-methylidynetri(phenylisocyanate)
2-ethoxy-4,4',4"-methylidynetri(phenylisocyanate)
5-methyl-2,4',4"-methylidynetri(phenylisocyanate)
3-bromo-4,4',4"-methylidynetri(phenylisocyanate)
4-methyl-3,4',4"-methylidynetri(phenylisocyanate)
2-chloro-4,4',4"-methylidynetri(phenylisocyanate)
2,3-dimethyl-4,4',4"-methylidynetri(phenylisocyanate)
4,6-dimethyl-3,4'4,"-methylidynetri(phenylisocyanate)
3,6-dimethyl-4,4',4"-methylidynetri(phenylisocyanate)

2',2''-dimethyl-2,4',4''-methylidynetri(-phenylisocyanate)

These isocyanic acid methylidynetri-p-phenylene esters are made by phosgenation of the corresponding amines as described, for example, in Siefken [Liebig's Annalen 562, 75, 96, 135 (1949)].

Another class of useful triisocyanates include arylenediisocyanate trimers having the formula

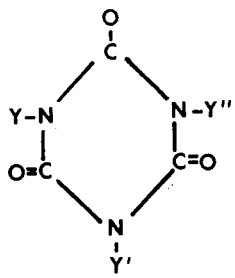

where Y, Y', and Y'' are independently selected from

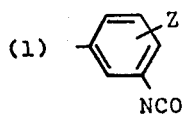

wherein Z is selected from $C_1$–$C_{18}$ alkyl (preferably methyl), halo (preferably chloro or bromo), and $C_1$–$C_{12}$ alkoxy (preferably $C_1$–$C_4$ alkoxy),

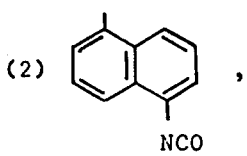

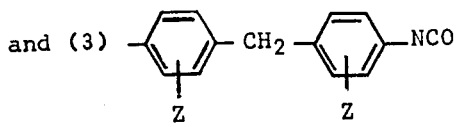

These trimers are made by mixing a phenylenediisocyanate

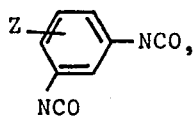

or 1,5-naphthylenediisocyanate, or a 4,4'-methylenediphenylisocyanate with a "crown" complex of a basic alkali metal salt and at least 1 mole (per gram atom of the cation of said salt) of a macrocyclic polyether "crown" compound as described in U.S. Pat. No. 3,622,577. Typical "crown" compounds are described in U.S. Pat. Nos. 3,562,295; 3,687,978; and 3,686,225. 2,4-Tolylenediisocyanate, 4,4'-methylenediphenylisocyanate, and 1,5-naphthylenediisocyanate are examples of simple diisocyanates which are preferred for trimerization. Also useful are polymeric polyisocyanates such as those prepared by the phosgenation of polyamines present in crude undistilled 4,4'-methylenedianiline made by condensing aniline and formaldehyde in the presence of mineral acid.

Also useful are trimerized crude or undistilled isocyanate mixtures that contain complex, high molecular weight, tarry materials produced by the reaction of phosgene and an organic amine. Such phosgenation by-products are generally considered by those skilled in the art to be comprised largely of biuret and polymeric biuret molecules having free isocyanato groups. These isocyanato groups can participate in trimer formation along with the isocyanato groups of other mono- and polyisocyanates present.

Mixtures of the organic polyisocyanates can be used when desired. Conveniently, the polyisocyanate can be, and usually is, applied to the surface of the cured elastomer in a solvent. Suitable solvents include aromatic hydrocarbons such as toluene, chlorinated hydrocarbons such as dichloromethane, ketones such as acetone and methyl ethyl ketone, esters such as ethyl acetate and butyl acetate, and ethers such as ethyl cellosolve. The amount of organic aromatic polyisocyanate used is that sufficient to form a thin coating, for example, 1 to 10 mils (0.0025–0.025 cm), on the surface of the hydrocarbon elastomer.

The copolymers used in this invention are cured elastomeric hydrocarbon copolymers made from ethylene and a higher α-monoolefin (most preferably propylene), usually containing 20–80, preferably 50–75, percent by weight ethylene units, by, preferably, using catalysts generally known as coordination catalysts or Ziegler catalysts (for which $VOCl_3$, $VCl_4$, vanadium tris(acetyl acetonate), or $TiCl_4$ are desirably selected as transition metal components). Preferably, the copolymers used in the invention contain monomer units of at least one polyene, desirably a monoreactive nonconjugated diene to provide at least about 0.1 gram mole of ethylenically unsaturated side chains/kg of copolymer as sulfur or resin cure-sites. Representative nonconjugated dienes include aliphatic dienes such as 1,4-hexadiene, cycloaliphatic dienes such as 1,5-cyclooctadiene and cyclopentadiene, 5-alkylidene-2-norbornenes such as 5-ethylidene-2-norbornene and 5-methylene-2-norbornene, 5-alkenyl-2-norbornenes such as 5-propenyl-2-norbornene and 5,6-alkenylene-2-norbornenes such as dicyclopentadiene. Peroxide cures are suitable for copolymers such as ethylene/propylene that are substantially saturated or copolymers having side-chain unsaturation such as ethylene/propylene/1,4-hexadiene. Such cured elastomeric copolymers used in this invention are well known in the art and are described in, for example, U.S. Pat. Nos. 2,933,480, 2,975,159; 3,000,867; 3,063,973; 3,063,620; 3,063,621; 3,211,709; 3,379,901; and 3,300,459. Small proportions of direactive (dipolymerizable) dienes such as 2,5-norbornadiene and 1,7-octadiene can be incorporated to branch the copolymer as described in U.S. application Ser. No. 247,879, filed Apr. 13, 1972 now U.S. Pat. No. 3,819,591. Representative preferred copolymers include ethylene/propylene, ethylene/propylene/1,4-hexadiene, with or without 2,5-norbornadiene, and ethylene/propylene/5-ethylidene-2-norbornene. An especially preferred composition contains, by weight, 25–35% propylene monomer units, 1–8% monomer units of a nonconjugated diolefin containing only one polymerizable double bond selected from aliphatic diolefins, and cycloaliphatic compounds having a one- or two-carbon bridged ring structure, such as 1,4-hexadiene, dicyclopentadiene, 5-ethylidene-2-norbornene, or 5-(2'-propenyl)-2-norbornene, and 0.1–0.4% direactive polyolefin units, such as 2,5-norbornadiene monomer units. The branched copolymers of U.S. Pat. No. 3,652,729 are also suitable.

The cured elastomeric copolymer can be adhesively bonded to any metal to form a composite article. Representative metals that are used to form the composite structure include steel, copper, brass, aluminum, and iron. Preferably, the hydrocarbon elastomeric copolymer is bonded to chrome-plated steel to form, for example, bumpers for automotive use. In order that the composite article display desirable weathering resistance, the surface area of the metal that is to form the bond must be coated with epoxy-based or chlorinated rubber/phenolic-resin-based metal adhesive primers. Epoxy-based or chlorinated rubber/phenolic resin-based primers applied to the metal surface to be bonded provide excellent humidity resistance at the bond and promote the formation of a strong bond with the polyester. A broad class of useful epoxy-based primers contains the reaction products of aliphatic or aromatic polyols, m.w. up to 300, with excess epichlorohydrin. A particularly useful class of epoxy-based primers that can be used in the present invention have the formula chlorinated cis-1,4-polyisoprene) and phenol-formaldehyde resin usually containing a minor proportion of at least one filler such as silicon dioxide, carbon black, and zinc oxide. The ratio of rubber to resin ranges from about 1:2 to 2:1. Chlorinated rubber is described in U.S. Pat. Nos. 2,072,255 and 2,101,138. It is frequently made by treating a solution of natural rubber (usually degraded by milling or oxidative scission, e.g., with chlorine dioxide) with chlorine at 80°C., until the chlorine content of the rubber reaches about 65–72% by weight. This partially cyclized product has a specific gravity of 1.54–1.66, a refractive index of 1.554–1,596, and a molecular weight as high as 100,000, or above.

Heat curable phenol-formaldehyde resols present as a component in the primer containing chlorinated rubber are parpared by heating phenol (optionally, having p-substituent, such as a $C_3$–$C_{20}$-p-alkyl, a $C_5$–$C_6$ cycloalkyl, phenyl, and benzyl) with more than a mole of formaldehyde in the presence of a strong basic catalyst such as an alkali metal hydroxide at 25°–100°C. to form methylol phenols and then forming condensation polymers by heating at about 75°–175°C. The mixture is then neutralized and the resol recovered. If part or all of the synthesis is done in the presence of an alcohol such as methanol or butanol the resol will have the structure

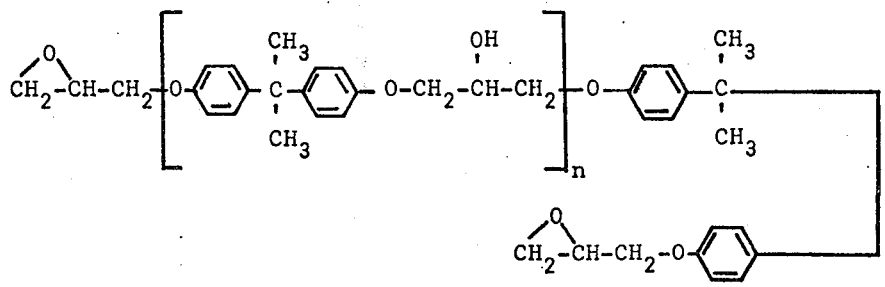

wherein $n = 0$–1000, frequently 0–10. These compounds are the well-known reaction products of epichlorohydrin and 4,4'-isopropylidenediphenol (also called bisphenol A) and are described in U.S. Pat. Nos. 2,633,458 and 2,902,398. Glycerol can be used in place of part or all of bisphenol A. Other epoxy-based primers that can be used to coat the surface of the metal are described in *Handbook of Adhesives* by Skeist, Reinhold Publishing Corporation, N.Y., 1962, pages 298–305, 323–332, 512–522, and 601–608, and Kirk-Othmer, *Encyclopedia of Chemical Technology*, Second Edition, 1965, Interscience Publishers, N.Y., Vol. 8, pages 294–312. The epoxy-based primers can contain additional components such as antioxidants, reactive and/or catalytic hardeners, and fillers (such as silica and carbon black). Reactive hardeners are often supplied in stoichiometric proportions based on the epoxy group content. Polyamines such as diethylenetriamine, m-phenylenediamine, 4,4'-sulfonyldianiline, and 4,4'-methylenedianiline are examples. Catalytic hardeners that can be used in less than stoichiometric proportions include tris(dimethylaminomethyl)phenol, $BF_3$.ethylamine adduct, and phthalic anhydride. The epoxy resin primers can be partially prereacted before use; such products will have few or no terminal epoxy groups.

Chlorinated rubber/phenolic based metal adhesive primers are a mixture of chlorinated natural rubber (or

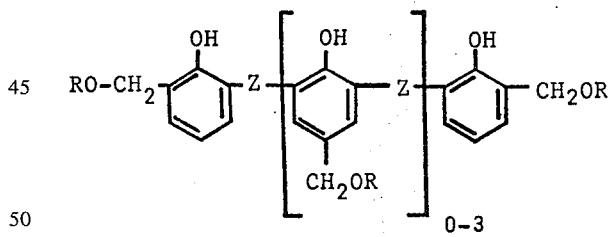

where $Z = $ —$CH_2$— or —$CH_2$—O—$CH_2$— and $R = H$, $CH_3$—, $CH_3CH_2CH_2CH_2$—.

The thermoplastic segmented copolyester adhesive used consists essentially of 15–75, preferably 30–65, percent by weight, recurring said short-chain ester units ("hard segments"), and 25–85, preferably 30–75, percent by weight, said long-chain ester units ("soft segments") joined through ester linkages as represented by the formula disclosed hereinbefore. The term "short-chain ester units," as applied to units in a polymer chain, refers to the reaction products of low molecular weight diols with dicarboxylic acids to form repeat units having molecular weights of about 192–503. These units are also referred to herein as "hard segments." The term "long-chain ester units", as applied to units in a polymer chain, refers to the reaction products of long-chain glycols with dicarboxylic acids. These repeat units have molecular weights of 730–4274. These units are also referred to herein as "soft segments."

The copolyesters used as adhesives in this invention are prepared by polymerizing with each other (a) one or more aromatic dicarboyxlic acids $R(CO_2H)_2$, (b) one or more linear long-chain glycols $G(OH)_2$, and (c) one or more low molecular weight diols $D(OH)_2$. By the term "aromatic dicarboxylic acid" is meant a dicarboxylic acid in which the carboxyl groups are attached to benzenoid carbon atoms in an isolated or fused ring system. The term "dicarboxylic acid," as used herein, is intended to include the equivalents of dicarboxylic acids, that is, their esters or ester-forming derivatives such as acid chlorides and anhydrides, or other derivatives which can be substituted for dicarboxylic acids in a polymerization reaction to make a copolyester.

The aromatic dicarboxylic acid monomers have a molecular weight of about 166–310. This molecular weight requirement pertains to the acid itself and not to its ester or ester-forming derivative. Any derivative should furnish R groups having a molecular weight of 76–220. The aromatic dicarboxylic acids used in the preparation of the segmented copolyester can contain any substituent groups or combination thereof which do not interfere with the polymerization reaction. Representative aromatic dicarboxylic acids include terephthalic acid, isophthalic acid, phthalic acid, bibenzoic acid, substituted dicarboxy compounds with benzene nuclei such as 4,4'-methylenedibenzoic acid, 4,4'-oxydibenzoic acid, ethylene-bis(p-oxybenzoic acid), 4,4'-ethylene-dibenzoic acid, tetramethylene-bis(p-oxybenzoic acid), 1,5-naphthalenedicarboxylic acid, 2,6-naphthalenedicarboxylic acid, 2,7-naphthalenedicarboxylic acid, phenanthrenedicarboxylic acid, anthracenedicarboxylic acid, 4,4'-sulfonyldibenzoic acid, indene dicarboxylic acid, as well as ring-substituted derivatives thereof such as $C_1$–$C_{10}$ alkyl, halo, or $C_1$–$C_4$ alkoxy.

The preferred aromatic dicarboxylic acids used in the preparation of the segmented copolyester adhesives are the aromatic acids of 8–16 carbon atoms, particularly phenylenedicarboxylic acids such as phthalic, terephthalic and isophthalic acids. The most preferred acids are terephthalic acid and mixtures of terephthalic and isophthalic acids.

The low molecular weight diols used in the preparation of the hard segments of the copolyesters have molecular weights of about 62 to 229. The term "low molecular weight diol," as used herein, includes equivalent esterforming derivatives which provide D groups having a molecular weight in the range of about 28–195.

Suitable low molecular weight diols which react to form the short-chain ester units of the copolyesters include acyclic, alicyclic and aromatic dihydroxy compounds. The preferred diols are those with 2–15 carbon atoms such as ethylene, propylene, trimethylene, tetramethylene, isobutylene, pentamethylene, 2,2-dimethyltrimethylene, hexamethylene and decamethylene glycols, cyclohexanediols, cyclohexane, dimethanol, resorcinol, hydroquinone, 1,5-naphthalenediol. Especially preferred are the aliphatic diols of 2–8 carbon atoms. Suitable bis-phenols include 4,4'-diphenylenediol, 4,4'-methylenediphenol, 4,4'-ethylenediphenol, 4,4'-trimethylenediphenol, and isopropylidenediphenol. Equivalent ester-forming derivatives of diols are also useful. For example, ethylene oxide or ethylene carbonate can be used in place of ethylene glycol.

The long-chain glycols used to prepare the soft segments of these copolyesters have molecular weights of about 350–6000, and preferably about 800–3000. Preferably, the long-chain glycols have melting points of less than about 55°C., and carbon atom to oxygen atom ratios which are greater than about 2.5, that is, greater than about 2.5:1.

Suitable $\alpha,\omega$- long-chain glycols which can be used in preparing the soft segments of the copolymers include poly(alkylene ether)glycols in which the alkylene group has 3–9 carbon atoms, such as poly(1,2- and 1,3-propylene ether)glycol, poly(1,2-butylene ether)glycol, poly(tetramethylene ether)glycol, poly(pentamethylene ether)glycol, poly(hexamethylene ether)glycol, poly(heptamethylene ether)glycol, poly(octamethylene ether)glycol, poly(nonamethylene ether)glycol, and random or block copolyether glycols, for example, glycols derived by copolymerizing tetrahydrofuran and 1,2-propylene oxide (or an oxetane such as oxycyclobutane).

Suitable long-chain glycols also include polyformals prepared by reacting formaldehyde with glycols such as pentamethylene glycol or mixtures of glycols such as a mixture of tetramethylene and pentamethylene glycols. Poly(alkylenethioether) and poly(alkylene ether thioether) glycols also provide useful copolyester adhesives. The preferred long-chain glycols are poly(alkylene ether) glycols and glycol esters of poly(alkylene oxide)dicarboxylic acids.

The relative molecular weight of the segmented copolyester adhesive is expressed herein in terms of melt index, which is an empirical measurement of inverse melt viscosity. The segmented copolyester should have a melt index of less than about 150. The melt indices specified herein are determined by the American Society for Testing and Materials, (herein abbreviated "ASTM"), test method D-1238, at 200°C. with a 2160-g. load.

It is required that the segmented copolyester adhesive have a melting point of at least about 125°C. Preferably, the segmented copolyester has a melting point of at least about 140°C. The high-melting segmented copolyesters maintain their high melting characteristics when blended with low molecular weight thermoplastic resins.

The required high melting point of the segmented copolyester adhesive is obtained by providing the polyester with crystallizable short-chain ester segments. Crystallinity in the short-chain ester segments is increased by the use of more linear and symmetrical aromatic diacid. By "linear" aromatic diacid is meant a diacid in which each of the bonds between the carboxyl carbons and their adjacent carbons fall on a straight line drawn from one carboxyl carbon to the other. By "symmetrical" aromatic diacid is meant a diacid which is symmetrical with respect to a center line drawn from one carboxyl carbon to the other.

The melting points specified herein are determined by differential thermal analysis (ASTM D-2117). The melting point is read from the position of the endotherm peak in a thermogram when the sample is heated from room temperature at the rate of 10°C./min. The details of this method are described in many publications, for example, C. B. Murphy in *Differential Thermal Analysis*, R. C. Mackenzie, Editor, Volume I, pages 643 to 671, Academic Press, New York, 1970.

The preferred segmented copolyester adhesives are those in which the aromatic dicarboxylic acid has from 8–16 carbon atoms, the low molecular weight diol is aliphatic having from 2–8 carbon atoms, the long-chain glycol is poly(alkylene ether)glycol in which the alkylene group has from 3–9 carbon atoms, the short-chain ester units amount to about 30–65 percent by weight of the copolyester, the long-chain ester units amount to about 30–75 percent by weight of the copolyester, and the copolyester has a melt index of less than about 50, a melting point of at least about 140°C., and a Shore D (ASTM D-2240) durometer hardness of 30 to 50 (40 being particularly preferred).

The copolyester adhesives prepared from terephthalic acid, or a mixture of terephthalic and isophthalic acids, 1,4-butanediol and poly(tetramethylene ether) glycol having a molecular weight of about 600–3000 are particularly preferred.

The copolyester adhesives used in this invention can be made by conventional condensation polymerization procedures, as for example, in bulk or in a solvent medium which dissolves one or more of the monomers. They are conveniently prepared by a conventional ester interchange reaction. A preferred procedure involves heating the dimethyl ester of terephthalic acid, or a mixture of terephthalic and isophthalic acids, with a long-chain glycol and an excess of a short-chain diol in the presence of a catalyst at 150°–260°C, followed by distilling off the methanol formed by the interchange. Heating is continued until methanol evolution is complete. Depending on the temperature, catalyst and diol excess, this polymerization is complete within a few minutes to a few hours. This procedure results in the preparation of a low molecular weight prepolymer which can be converted to the high molecular weight segmented copolyester.

The resulting prepolymer is then converted to the high molecular weight segmented copolyester elastomer by distillation of the excess of short-chain diol. Best results are usually obtained if this final distillation is carried out at less than 1 mm pressure and 240°–260°C for less than 2 hours in the presence of an antioxidant such as sym-di-beta-naphthyl-p-phenylenediamine or 1,3,5-trimethyl-2,4,6-tris[3,5-ditertiary-butyl-4-hydroxybenzyl] benzene.

Most practical polymerization techniques rely on ester interchange to complete the polymerization reaction. In order to avoid excess hold times at high temperatures with possible irreversible thermal degradation, it is advantageous to employ a catalyst for the ester interchange reaction. While a wide variety of catalysts can be used, organic titanates such as tetrabutyl titanate, used alone or in combination with magnesium or zinc acetates, are preferred. Complex titanates, such as $Mg[HTi(OR)_6]_2$, derived from alkali or alkaline earth metal alkoxides and titanate esters are also very effective. Inorganic titanates such as lanthanum titanate, calcium acetate/antimony trioxide mixtures, and lithium and magnesium alkoxides are representative of other catalysts which can be used.

In addition to the flexible, non-brittle segmented copolyester, the adhesive composition can also contain, if desired, up to about 60 weight percent of one or more low molecular weight thermoplastic resins which form compatible mixtures with the segmented copolyester, are thermally stable at about 150°C., and have melt viscosities of less than about 10,000 centipoises at 200°C. These resins are added to control the hardness of the adhesive. The term "thermoplastic resin," as used throughout the specification and claims, is intended to include heat-softenable resins, both natural and synthetic, as well as waxy types of materials. By the term "compatible" is meant that there is no separation into distinct layers between the segmented copolyester and the low moelcular weight resin or resins at the copolyester melt temperature. In some cases, this compatibility is achieved in multi-component blends even though one of the low molecular weight thermoplastic resin components may not be compatible with the segmented copolyester elastomer alone. By the phrase "thermally stable" is meant that there is no significant permanent alteration in the properties of the resin after heating at the specified temperature for one hour in the presence of air. The melt viscosities specified herein are measured with a Brookfield viscometer by ASTM test method D 1824-66 at elevated temperatures as indicated.

Suitable low molecular weight thermoplastic resins include hydrocarbon resins, bituminous asphalts, coal tar pitches, rosins, phenolic resins, and chlorinated aliphatic hydrocarbon waxes.

The term "hydrocarbon resins" refers to hydrocarbon polymers derived from coke-oven gas, coal-tar fractions, cracked and deeply cracked petroleum stocks, essentially pure hydrocarbon feeds, and turpentines. Typical hydrocarbon resins include coumarone-indene resins, petroleum resins, styrene polymers, cyclopentadiene resins, and terpene resins. These resins are fully described in the Kirk-Othmer "Encyclopedia of Chemical Technology," Second Edition, 1966, Interscience Publishers, New York, Volume 11, pages 242 to 255.

The term "coumarone-indene resins" refers to hydrocarbon resins obtained by polymerization of the resinformers recovered from coke-oven gas and in the distillation of coal tar and derivatives thereof such as phenol-modified coumarone-indene resins. These resins are fully described in the Kirk-Othmer Encyclopedia, supra, Volume 11, pages 243 to 247.

The term "petroleum resins" refers to hydrocarbon resins obtained by the catalytic polymerization of deeply cracked petroleum stocks. These petroleum stocks generally contain mixtures of resin-formers such as styrene, methyl styrene, vinyl toluene, indene, methyl indene, butadiene, isoprene, piperylene and pentylenes. These resins are fully described in the Kirk-Othmer Encyclopedia, supra, Volume 11, pages 248 to 250. The so-called "polyalkyl-aromatic resins" fall into this classification.

The term "styrene polymers" refers to low molecular weight homopolymers of styrene as well as copolymers containing styrene and other comonomers such as alphamethyl-styrene, vinyl toluene, and butadiene when prepared from substantially pure monomer.

The term "cyclopentadiene resins" refers to cyclopentadiene homopolymers and copolymers derived from coal-tar fractions or from cracked petroleum streams. These resins are produced by holding a cyclopentadiene-containing stock at elevated temperature for an extended period of time. The temperatures at which it is held determine whether the dimer, trimer, or higher polymer is obtained. These resins are fully described in the Kirk-Othmer Encyclopedia, supra, Volume 11, pages 250 and 251.

The term "terpene resins" refers to polymers of terpenes which are hydrocarbons of the general formula $C_{10}H_{16}$ occurring in most essential oils and oleoresins of plants and phenol-modified terpene resins. Suitable terpenes include alpha-pinene, beta-pinene, dipentene, limonene, myrcene, bornylene, and camphene. These resins are fully described in the Kirk-Othmer Encyclopedia, supra, Volume 11, pages 252 to 254.

The term "bituminous asphalts" is intended to include both native asphalts and asphaltites such as Gilsonite, Glance pitch and Grahanite. A full description of bituminous asphalts can be found in Abraham's "Asphalts and Allied Substances," 6th Edition, Volume 1, Chapter 2, Von Nostrand Co., Inc., particularly Table III on page 60.

The term "coal-tar pitches" refers to the residues obtained by the partial evaporation or distillation of coal tar obtained by removal of gaseous components from bituminous coal. Such pitches include gas-works coal-tar pitch, coke-oven coal-tar pitch, blast-furnace coal-tar pitch and producer-gas coal-tar pitch. These pitches are fully described in Abraham's "Asphalts and Allied Substances," supra, particularly Table III on page 61.

The term "rosins" refers to the resinous materials that occur naturally in the oleoresin of pine trees, as well as derivatives thereof including rosin esters, modified rosins such as fractionated, hydrogenated, dehydrogenated, and polymerized rosins, and modified rosin esters. These materials are fully described in the Kirk-Othmer Encyclopedia, supra, Volume 7, pages 475 to 505.

The term "phenolic resins" refers to the products resulting from the reaction of phenols with aldehydes. In addition to phenol itself, cresols, xylenols, p-tert-butylphenol, p-phenylphenol and the like can be used as the phenol component. Formaldehyde is the most common aldehyde, but acetaldehyde and furfuraldehyde can also be used. These resins are fully described in the Kirk-Othmer Encyclopedia, supra, Volume 15, pages 176 to 207.

The adhesive compositions used can contain more than one low molecular weight thermoplastic resin. For example, low molecular weight styrene polymers have been found to lower the melt viscosity of these compositions without substantially lowering the softening point. Since low melt viscosity contributes improved wetting by the composition of the surface of the substrate, which results in better adhesion, many useful compositions will contain some styrene polymer. Styrene polymers are also useful for increasing the compatibility of other resins with the segmented copolyester elastomeric adhesive. Coumarone-indene resins of high softening point have been found to give strength to the compositions. Phenol-modified coumarone-indene resins have been found to have the effect of lowering the softening point of the compositions. In fact, the effect of phenol-modified coumarone-indene resins on the melting point is so great that the desired melting point is generally achieved by the addition of only a small amount of this resin. Any combination of these desired properties can be achieved by mixing two or more low molecular weight thermoplastic resins with the copolyester elastomer in a proper proportion.

It is sometimes desirable to stabilize the adhesive compositions against heat or radiation by ultraviolet light. This can be done by incorporating stabilizers or antioxidants in these compositions. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state.

Representative phenol derivatives useful as stabilizers include hydroquinone, 2,6-ditertiary-butyl-p-cresol, tetrakis[methylene-3-(3',5'-ditertiary-butyl-4'-hydroxyphenyl) propionate] methane, 4,4'-bis(2,6-ditertiary-butylphenol), 1,3,5-trimethyl-2,4,6-tris[3,5-ditertiary-butyl-4-hydroxybenzyl] benzene, and 4,4'-butylidene-bis(6-tertiary-butyl-m-cresol). Various inorganic metal salts or hydroxides can be used as well as organic complexes such as nickel dibutyl dithiocarbamate, manganous salicylate, and copper 3-phenyl-salicylate. Typical amine stabilizers include aromatic amines such as N,N'-bis(beta-naphthyl)-p-phenylenediamine, N,N'-bis(1-methylheptyl)-p-phenylenediamine, and either phenyl-beta-naphthylamine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The copolyester elastomers and the low molecular weight thermoplastic resins are easy to blend together due to the relatively low melt viscosity of these compositions at elevated temperatures as compared to compositions of the prior art having comparable bond strength. The copolyester-resin adhesive composition can be blended by various well known procedures such as, for example, blending in molten form, blending in a solvent, such as chloroform or methylene chloride, or mixing aqueous dispersions of the components.

Aqueous dispersions of the thermoplastic compositions can be prepared by dissolving the segmented copolyester and the low molecular weight thermoplastic resin together in a suitable water-immiscible organic solvent, emulsifying the organic solvent containing the segmented copolyester and the low molecular weight thermoplastic resin in water, and removing the organic solvent as described by Funck and Wolff in U.S. Pat. No. 3,296,172.

After the surface of the cured elastomer has been coated with the aromatic polyisocyanate (having an —NCO functionality of at least three and wherein the —NCO groups are unhindered and on separate rings) and the metal has been primed, the adhesive copolyester-resin compositions are applied to the surface of the primed metal or the polyisocyanate-coated cured hydrocarbon elastomer or interposed between the surfaces in the form of a dry blend, a solution, an aqueous dispersion, or in molten form. Generally, the adhesive composition is applied to the polyisocyanate-coated elastomeric surface. Conventional application equipment can be used for applying the adhesive compositions in the various forms. For application of solutions, dispersions, or melts, various known application techniques can be used including brushing, spraying, or roll-coating.

The composite structure of elastomer-copolyester-metal is placed in a hydraulic press. Sufficient pressure, e.g., on the order of about 10–100 psi, is applied to make the adhesive flow properly and contact the surfaces of the elastomer and metal being bonded. If the adhesive is in the solid state, heat is also applied during the bonding operation so that the adhesive composition is converted to the molten state. The adhesive can be melted and applied as a liquid, in which case heating is not required. However, glue-line temperatures of the order of 160°–200°C. are generally used during the bonding step in order to assure that the adhesive is in the molten state. The adhesive composition readily flows on the surface of the polyisocyanate-coated elastomer and the primer-coated metal and the metal becomes firmly bonded to the elastomer, usually in less than about one minute. The adhesive layer of the composite structure is allowed to cool to ambient temperature upon removal from the press.

The composite structures are useful as automobile bumpers and are especially useful as engine mounts and other "under-the-hood" applications for automotive use where high-temperature capabilities of the bonded article are necessary.

The following example illustrates the invention in detail.

EXAMPLE 1

A sample of EPDM-hydrocarbon elastomer was compounded as follows:

| | Parts by Weight |
|---|---|
| Ethylene/propylene/1,4-hexadiene (EPDM)* | 100 |
| FEF carbon black** | 120 |
| Zinc oxide | 5 |
| Zinc stearate | 1.5 |
| Paraffinic oil, Saybolt universal Viscosity 155 sec. at 100°F., 43.6 sec. at 212°F. | 45 |
| [(C₄H₉O)₂-PS₂]₂Zn*** | 2 |
| Sulfur | 3 |
| (2-Morpholinothio)benzothiazole | 1 |

* Monomer unit composition (by weight): 57% ethylene, 37% propylene, 6% 1,4-hexadiene, Mooney viscosity (ML-1+4/121°C.) 35.

**ASTM Designation N-550

***C₄H₉O = butoxy

The copolymer was cured for 10 minutes at 177°C. in a 1-inch (2.54 cm) by 6 inch (15.3 cm) by ¼ inch (0.635 cm) compression mold between sheets of polyester film. Slabs so cured were then cleaned by a solvent wipe with trichloroethylene. the elastomer was coated with a 10% solution of the aromatic polyisocyanate 4,4′,4″-methylidynetris(phenyl isocyanate) in dichloromethane.

An adhesive composition was prepared by melt-blending forty parts by weight of a low molecular weight polystyrene resin component having a ball and ring melting point of 50°C., a molecular weight of about 350, and a specific gravity of about 1.04, and 60 parts by weight of a thermoplastic segmented polyester component. The polyester component was made by condensation polymerization of 35 ml polytetramethyleneether glycol (number-average molecular weight 1,000) PTMEG-1000, 25 ml. 1,4-butanediol (E), 31 g. dimethyl terephthalate (T), and 9 g. dimethyl isophthalate (I) in the presence of the catalyst tetrabutyl titanate and magnesium acetate. The copolyester had a Shore D hardness of 40, a melt index of 4.8 grams/10 min., a melting point of 168°C., and an inherent viscosity of about 1.5 ±0.05 measured at 30°C. on a solution of 0.5 g. of copolyester in 100 ml. of a mixed solvent containing 54 parts phenol, 6 parts water, and 40 parts 1,1,2-trichloroethane. The copolyester had 49 weight percent short-chain units ("4EI" 11 weight percent, "4ET" 38 weight percent), the long-chain ester units amounted to 51 weight percent ("PTMEG-1000 I" or "PTMEG-1000-T").

During melt blending, the mixture was blanketed with nitrogen and the temperature was not allowed to exceed 230°C. The adhesive composition was pressed between sheets of polyester to a thickness of 10 mils (0.025 cm) at a temperature of 177°C.

Before use, the resulting adhesive, "sandwich" was cut to the desired size and cooled at −78°C. in crushed solid carbon dioxide. At this temperature, the polyester film could be stripped off, leaving a 10-mil (0.025 cm) sheet of the adhesive of the desired size.

Steel coupons approximately 5 inches (12.7 cm) by 1 inch (2.54 cm) by 16 gauge (0.129 cm) were cleaned by sand-blasting and then degreased in refluxing perchloroethylene vapor, and ethylene vapor, and cooled. Two coats of an epoxy-based primer (Thixon XAB 894) containing bisphenol A-epichlorohydrin copolymer were painted on one side of this metal coupon. This primer, more particularly, was a cellosolve acetate solution of a linear copolymer of epichlorohydrin and 4,4′-propylidenebisphenol having the formula

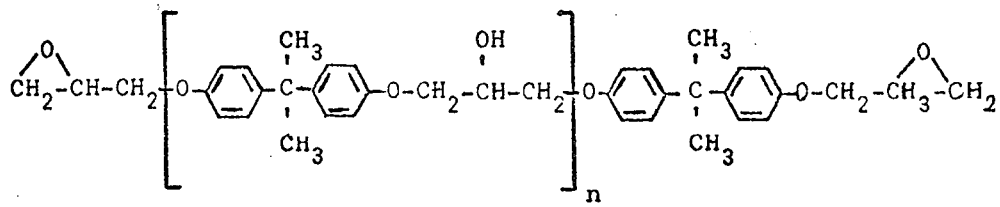

where $n = 8-11$, which had been chain extended leaving an insignificant proportion of terminal epoxy groups. About 0.2 weight percent $SiO_2$ was also present based on the whole weight of the primer.

The central 2¼ in. (5.72 cm) of the primed steel coupon was masked by placing four 1-mil (0.0025 cm) strips of half-inch-wide (1.27 cm) polyester tape, one on top of another of each end of the coupon to give a 4-mil (0.010 cm) thick band at each end. Between these bands was placed a strip of the above-mentioned adhesive composition 1 inch × 2¼ inches × 10 mils (2.54 × 5.72 × 0.025 cm) and centered on top of this the cured EPDM elastomer, which had been painted with two coats of a 10% solution by weight of 4,4′,4″-methylidynetris(phenylisocyanate), was placed parallel to the metal coupon with the treated surface facing the adhesive film layer. This configuration (primed metal coupon-adhesive-coated EPDM elastomer) was placed in a hydraulic press (which had been preheated to 177°C.) and compressed under a pressure of about 40 psi (3.6 kg/cm²) for a total time of 1 minute. During this time, heat was conducted to the glue line which reached a temperature of about 166°C. At the end of this time, pressure was removed and the composite was rapidly removed from the press and allowed to cool to room temperature.

Adhesion of the composite was tested by ASTM D-429-B T-peel test (at 25°C.), modified to the extent that both ends of the bonded composite were pulled. Values of 100 and 118 pounds per lineal inch (17.9–21.0 kg/cm) were obtained with 100% of the failure occurring in the elastomer and not at the bond.

EXAMPLE 2

The procedure described in Example 1 was repeated except that the adhesive consisted of only the thermoplastic segmented copolyester component described in Example 1, the corresponding blending step with the thermoplastic resin being omitted. The adhesive in this case was obtained as a milled sheet about 4 mils (0.0025 cm) thick. Bonding was effected with a press temperature of about 204°C. for 1 minute. Samples were tested by pulling the EPDM at a 90° angle from the metal as in the T-peel test, complete failure occurring in the EPDM stock.

EXAMPLE 3

The procedure described in Example 1 was repeated except that the primer used on the metal comprised a solution of a mixture of chlorinated natural rubber and a soluble phenol-formaldehyde resin.

The primer composition had been dispersed in a mixture of methyl isobutyl ketone and 2-ethoxyethanol (20% solids). The primer composition itself consisted of about 73% by weight of a mixture of chlorinated natural rubber and a heat curable phenol-formaldehyde resol (about one part of rubber for each three parts of resol) and 27% by weight of a mixture of $SiO_2$, carbon black, and a minor proportion of ZnO. The chlorine content of the solvent-free primer was 21.9 weight percent. The primer was allowed to air dry before bonding.

Testing samples for T-peel provided values of 120 and 114 pounds per lineal inch (21.4 and 20.4 kg/cm) with failure in the EPDM stock. Exposure of another sample for 14 days in a humidity chamber at 38°C. and 100% relative humidity yielded T-peel values of 92 and 94 pounds per lineal inch (16.5 and 16.8 kg/cm) with complete failure in the EPDM stock.

EXAMPLE 4

A non-black EPDM was prepared as follows:

| | Parts by Weight |
|---|---|
| Ethylene/propylene/1,4-hexadiene (EPDM) | 100 |
| Suprex Clay | 120 |
| Zinc Oxide | 5 |
| Stearic Acid | 1 |
| Paraffinic Oil (Circosol 4240) | 20 |
| Sulfur | 2 |
| Zinc Dibutyldithiocarbamate | 2 |
| Tetramethylthiuram Disulfide | 0.5 |
| 2,2'-Dithiobis(benzothiazole) | 1 |

The above formulation was cured for 20 minutes at 160°C. and the procedure described in Example 1 was repeated. Testing for T-peel yielded values of 60 pli and 74 pli (10.7 and 13.2 kg/cm, respectively) with complete failure in the elastomer stock.

EPDM — This copolymer had the following monomer unit composition (by weight): ethylene, 62.6%, propylene, 32.0%; 1,4-hexadiene, 5.4%. The Mooney viscosity (ML-1+4/121°C.) was 58.

"Suprex" Clay, J. M. Huber Corp., New York, is an air-floated "hard" kaolin type characterized by the following equivalent analysis: 44–46% silica, 37.5–39.5% alumina, 1.5–2% iron oxide, and 1–2% titanium dioxide by weight, the ignition loss being 13.9–14.2% by weight.

"Circosol" 4240 is a naphthenic petroleum oil ASTM D-2226 type 103 having a molecular weight of 395. Its Saybolt Universal viscosity values at 100°F. and 210°F. are 2525 and 87.2 seconds, respectively. Its viscosity-gravity constant is 0.889.

EXAMPLE 5

The procedure described in Example 1 was repeated except that the chlorinated rubber-phenolic resol-based primer of Example 3 was used. The parts of the steel coupon which were not covered by adhesive primer were primed with a rust inhibiting primer after the bonding was completed in order to prevent the metal from corroding during salt spray and Florida exposure. The samples were subjected to the environments described below with the following results:

| Environment | T-Peel, kg/cm | Failure Mode |
|---|---|---|
| 14 days at 37.8°C. and 100% relative humidity | 14.3, 19.1 | Stock (EPDM) tear |
| 14 days at 70°C. (oven) | 8.9, 9.6 | Stock (EPDM) tear |
| 10 cycles of: 4 hrs. at –29°C., 4 hrs. at 70°C., 16 hrs. at 37.8°C. and 100% relative humidity | 13.9, 12.5 | Stock (EPDM) tear |
| 96 hrs. salt spray (ASTM B-117-61) | 18.2, 18.6 | Stock (EPDM) tear |
| 1 yr. exposure in Florida, 45 degree south, EPDM up | 21.4, 20.4 | Stock (EPDM) tear |

I claim:

1. In a process for manufacturing a composite structure of a metal bonded to a cured elastomeric hydrocarbon copolymer containing ethylene units and propylene units, the improvement which consists essentially of coating the surface of the cured elastomeric hydrocarbon copolymer with an organic aromatic polyisocyanate having an —NCO functionality of at least three and wherein the —NCO groups are unhindered and on separate rings, applying an epoxy-based or chlorinated rubber phenolic-based adhesive primer to the surface of the metal to be bonded, and interposing between the polyisocyanate-coated elastomeric surface and the metal-primed surface an adhesive composition, said adhesive composition comprising about 40–100 weight percent of a thermoplastic segmented copolyester having a melt index of less than 150 grams/10 minutes at 200°C. under a 2,160 gram load, and a melting point of at least about 125°C., said copolyester containing 15–75 weight percent short-chain ester units represented by the formula:

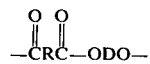

and 25–85 weight percent long-chain ester units represented by the formula:

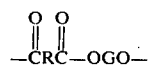

where R is a divalent aromatic radical having a molecular weight of about 76–220, D is a divalent organic radical having a molecular weight of about 28–220, and G is a divalent organic radical having a number-average molecular weight of about 566–3966, and up to about 60 weight percent of a low molecular weight thermoplastic resin which forms compatible mixtures with the segmented copolyester, is thermally stable at 150°C., and has a melt viscosity of less than about 10,000 centipoises at 200°C., applying pressure to the metal and elastomer sufficient to bond them together, thus forming said composite structure.

2. A process of claim 1 wherein the segmented copolyester adhesive contains 30–65 weight percent short-chain ester units and 30–75 weight percent long-chain ester units.

3. A process of claim 1 wherein the aromatic polyisocyanate is a triisocyanate derivative of triphenylmethane bearing substituents selected from alkyl containing 1–18 carbon atoms, halo, or alkoxy containing 1–12 carbon atoms.

4. A process of claim 2 wherein the aromatic polyisocyanate is 4,4′,4″-methylidynetris(phenyl isocyanate).

5. A process of claim 4 wherein the metal is chrome-plated steel.

6. A process of claim 4 wherein the copolymer contains units derived from a nonconjugated diene.

7. A process of claim 3 wherein the epoxy-based primer is the reaction product of 4,4′-propylidenebisphenol and epichlorohydrin.

8. A process of claim 7 wherein the resin is polystyrene.

9. A process of claim 3 wherein the chlorinated rubber phenolic-based primer contains a heat-curable phenol-formaldehyde resol.

10. A process of claim 9 wherein the thermoplastic resin is low molecular weight polystyrene.

11. A process of claim 3 wherein the adhesive is a polyester made from the copolymerization of poly(tetramethyleneether) glycol, 1,4-butanediol and dimethyl terephthalate.

12. A process of claim 11 wherein the epoxy-based primer is the reaction product of epichlorohydrin and 4,4′-propylidenebisphenol.

13. A process of claim 12 wherein the metal is chrome-plated steel.

14. A process of claim 3 wherein the copolymer contains, by weight, about 25–35 percent propylene monomer units, about 1–8 percent monomer units of a nonconjugated diolefin containing only one polymerizable double bond selected from (1) an aliphatic diolefin and (2) a cycloaliphatic compound having a one- or two-carbon bridged ring structure, and about 0.1–0.4 percent 2,5-norbornadiene monomer units.

15. A process of claim 14 wherein the nonconjugated diolefin is 1,4-hexadiene, 5-ethylidene-2-norbornene, dicyclopentadiene, or 5-(2′-propenyl)-2-norbornene.

* * * * *